United States Patent
Tsuchiya et al.

(10) Patent No.: US 10,435,795 B2
(45) Date of Patent: Oct. 8, 2019

(54) METHOD OF MANUFACTURING EDGED TOOL

(71) Applicant: SHINMAYWA INDUSTRIES, LTD., Takarazuka-shi, Hyogo (JP)

(72) Inventors: Takayuki Tsuchiya, Takarazuka (JP); Alexey Remnev, Takarazuka (JP)

(73) Assignee: SHINMAYWA INDUSTRIES, LTD., Takarazuka (JP)

( * ) Notice: Subject to any disclaimer, the term of this patent is extended or adjusted under 35 U.S.C. 154(b) by 2 days.

(21) Appl. No.: 15/811,133

(22) Filed: Nov. 13, 2017

(65) Prior Publication Data

US 2018/0216239 A1 Aug. 2, 2018

(30) Foreign Application Priority Data

Jan. 30, 2017 (JP) .................. 2017-014578

(51) Int. Cl.
| | |
|---|---|
| *C23C 8/14* | (2006.01) |
| *C23F 4/00* | (2006.01) |
| *C23C 8/02* | (2006.01) |
| *B26B 21/54* | (2006.01) |
| *B23P 15/40* | (2006.01) |

(52) U.S. Cl.
CPC ............... *C23F 4/00* (2013.01); *B26B 21/54* (2013.01); *C23C 8/02* (2013.01); *C23C 8/14* (2013.01); *B23P 15/403* (2013.01)

(58) Field of Classification Search
CPC ..... C23F 4/00; C23F 4/04; C23C 8/14; C23C 8/16; C23C 8/18; C23C 8/02; C23C 8/10; B23P 15/403; B26B 21/54

USPC ............ 216/67, 68, 72, 74, 78, 79; 438/706, 438/710, 712, 714, 715, 758, 770
See application file for complete search history.

(56) References Cited

U.S. PATENT DOCUMENTS

| | | | |
|---|---|---|---|
| 2008/0178476 A1* | 7/2008 | Luttgens | B43L 23/00 |
| | | | 30/346.54 |
| 2010/0178515 A1* | 7/2010 | Wang | B26B 21/60 |
| | | | 428/421 |
| 2013/0239769 A1* | 9/2013 | Carlisle | C23C 16/448 |
| | | | 83/651 |

(Continued)

FOREIGN PATENT DOCUMENTS

| | | |
|---|---|---|
| JP | S59-24094 B2 | 6/1984 |
| JP | 26-90792 B2 | 12/1997 |

(Continued)

*Primary Examiner* — Lan Vinh
(74) *Attorney, Agent, or Firm* — Oliff PLC (57) ABSTRACT

A method of manufacturing an edged tool on surfaces of which rusting and coloration hardly occur is provided. This method includes a plasma step which includes placing a metallic base having processed surfaces obtained by processing in a vacuum chamber, generating plasma in the vacuum chamber, and subjecting the metallic base to plasma treatment at a temperature of the metallic base adjusted to 280 to 325° C. to sharpen the processed surfaces to thereby obtain an edged tool precursor, and an oxidation step which includes reducing an internal temperature of the vacuum chamber to a specific temperature ranging from 100 to 225° C. after completion of generation of the plasma, and introducing an oxygen-containing gas into the vacuum chamber to form an oxide film on surfaces of the edged tool precursor.

2 Claims, 8 Drawing Sheets

(56) References Cited

U.S. PATENT DOCUMENTS

| | | | |
|---|---|---|---|
| 2015/0044880 A1* | 2/2015 | Noda | H01L 21/02164 438/778 |
| 2015/0096423 A1 | 4/2015 | Uemura et al. | |
| 2016/0040538 A1* | 2/2016 | Chen | F01D 5/288 60/805 |

FOREIGN PATENT DOCUMENTS

| JP | 2690792 B2 | 12/1997 |
|---|---|---|
| JP | 2011-174124 A | 9/2011 |
| JP | 2013-185256 A | 9/2013 |
| JP | 5924094 B2 | 5/2016 |

* cited by examiner

METHOD OF MANUFACTURING EDGED TOOL

BACKGROUND OF THE INVENTION

The present invention relates to a method of manufacturing an edged tool.

JP 5924094 B describes a process which involves performing plasma treatment to improve sharpness of a blade edge of an edged tool such as a razor blade or a microtome blade to slice a sample for sample observation.

Rusting and coloration have often occurred on a surface of an edged tool having undergone plasma treatment. In this case, the rusting impairs the aesthetic appearance of a commercial product to reduce its value. Then, a process which does not cause rusting or coloration has been required.

Propositions as described below have been made as conventional methods on this problem.

For instance, JP 2690792 B describes a method of preventing rusting from occurring, the method involving heating stainless steel under an oxidizing atmosphere at a temperature of not less than 800° but not more than 1,300° C. to deposit an aluminum oxide film on a surface thereof.

For instance, JP 2013-185256 A describes a method of preventing rusting from occurring, the method involving electrolyzing stainless steel with an electrolytic solution including a lithium compound-containing neutral salt.

For instance, JP 2011-174124 A describes a method which involves electrolysis through application of an alternating current or a current having an AC-DC superimposed waveform between a metal to be treated and an electrode through an electrolytic solution while irradiating with ultraviolet light.

SUMMARY OF THE INVENTION

Spot rusting and coloration have heretofore often occurred on a surface of an edged tool having undergone plasma treatment. In this case, the rusting and coloration impair the aesthetic appearance of a commercial product to reduce its value. Therefore, a process which does not cause rusting or coloration has been required.

Specifically, an object of the present invention is to provide a method of manufacturing an edged tool on surfaces of which rusting and coloration hardly occur.

The inventors of the present invention have made an intensive study to solve the above-mentioned problem and completed the present invention.

The present invention provides the following (1) and (2).
(1) An edged tool-manufacturing method comprising:
a plasma step which includes placing a metallic base having processed surfaces obtained by processing in a vacuum chamber, generating plasma in the vacuum chamber, and subjecting the metallic base to plasma treatment at a temperature of the metallic base adjusted to 280 to 325° C. to sharpen the processed surfaces to thereby obtain an edged tool precursor; and
an oxidation step which includes reducing an internal temperature of the vacuum chamber to a specific temperature ranging from 100 to 225° C. after completion of generation of the plasma, and introducing an oxygen-containing gas into the vacuum chamber to form an oxide film on surfaces of the edged tool precursor.
(2) The edged tool-manufacturing method according to (1) above, wherein the metallic base is made of stainless steel, and the oxide film is a passive film.

The present invention can provide a method of manufacturing an edged tool on surfaces of which rusting and coloration hardly occur. Since rusting hardly occurs, the aesthetic appearance of a commercial product is not impaired (its value is improved), the shelf life of the commercial product can be prolonged to eliminate waste of materials (resources are saved), and moreover, its surfaces do not have irregularities due to rust deposition but are smooth to improve blade performance (performance is improved).

DETAILED DESCRIPTION OF THE INVENTION

The present invention is now described.

The present invention provides an edged tool-manufacturing method comprising: a plasma step which includes placing a metallic base having processed surfaces obtained by processing in a vacuum chamber, generating plasma in the vacuum chamber, and subjecting the metallic base to plasma treatment at a temperature of the metallic base adjusted to 280 to 325° C. to sharpen the processed surfaces to thereby obtain an edged tool precursor; and an oxidation step which includes reducing an internal temperature of the vacuum chamber to a specific temperature ranging from 100 to 225° C. after completion of generation of the plasma, and introducing an oxygen-containing gas into the vacuum chamber to form an oxide film on surfaces of the edged tool precursor.

The manufacturing method as described above is hereinafter referred to also as "manufacturing method of the invention."

An edged tool obtained by the manufacturing method of the invention is hereinafter referred to also as "edged tool of the invention."

<Metallic Base>

A metallic base in the manufacturing method of the invention is first described.

Figure 1:
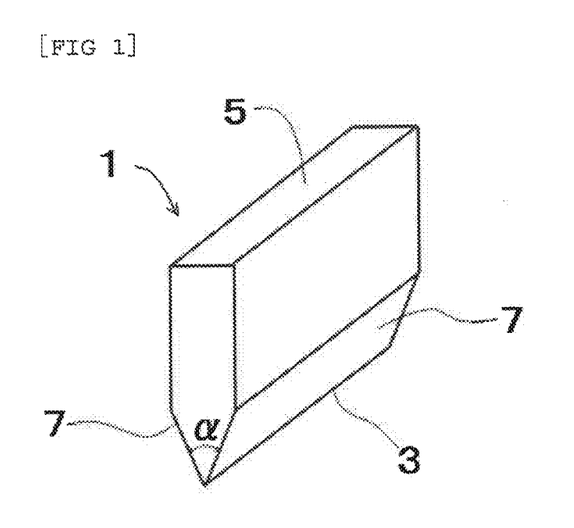
FIG. 1 is a schematic view illustrating a shape of a metallic base (blade base) that may be used in the invention.

The metallic base in the manufacturing method of the invention has processed surfaces obtained by processing and is not particularly limited as long as it can be used to obtain an edged tool such as a surgical blade (e.g., surgical knife) or a razor blade. As illustrated in FIG. 1, the metallic base is preferably a blade base 1 having two processed surfaces 7 formed by processing both side surfaces in the thickness direction of a plate-like blade member at its ventral end so that a predetermined sharpening angle α is formed from a blade edge 3 toward the dorsal side (dorsal end 5 side). A more preferred embodiment and its manufacturing method will be described later.

The size and the material of the metallic base are also not particularly limited as long as it can be used as a common surgical blade or razor blade, and a plate-like material made of stainless steel can be used, for example. The metallic base is preferably made of stainless steel because a passive film is easily formed by introducing atmospheric air into the vacuum chamber, as will be described later.

Further, the processed surfaces in the metallic base are preferably obtained by machining. Examples of the machining include grinding, drawing, and polishing (e.g., blasting and stropping), and two or more of these processing methods are preferably performed in combination. Specifically, grinding followed by polishing is preferred.

A preferred embodiment of the metallic base in the manufacturing method of the invention is described with reference to FIG. 2A and FIG. 2B. The metallic base in the manufacturing method of the invention is preferably a blade base illustrated in FIGS. 2A and 2B.

Figure 2A:
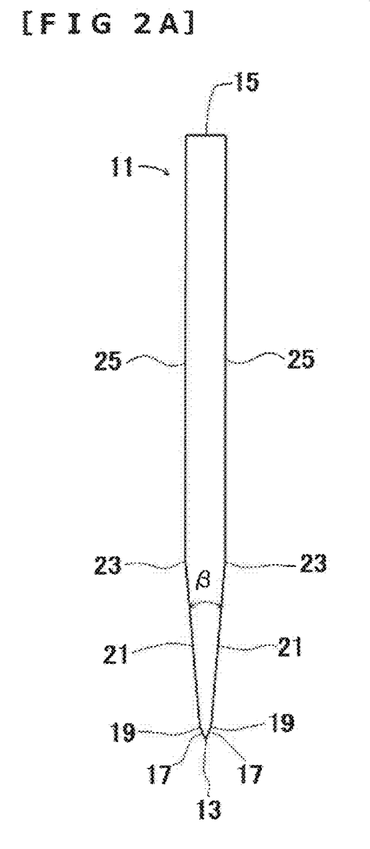
FIGS. 2A and 2B are schematic views illustrating another shape of the metallic base (blade base) that may be used in the invention.
Figure 2B:
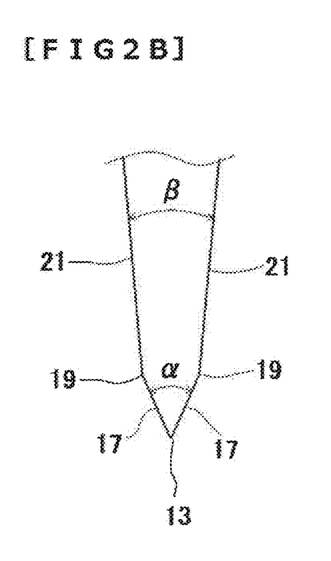

FIG. 2A is a schematic cross-sectional view of a blade base, and FIG. 2B is an enlarged view of the vicinity of a blade edge in FIG. 2A.

The blade base 11 illustrated in FIG. 2A includes two processed surfaces 17 formed by processing both side surfaces in the thickness direction of a plate-like blade member at its ventral end (end on the blade edge 13 side) so that the predetermined sharpening angle α is formed from the blade edge 13 toward the dorsal side (dorsal end 15 side); further two tapered surfaces 21 formed to continuously extend from the two processed surfaces 17 through their corresponding first boundaries 19 toward the dorsal side (dorsal end 15 side) so that a predetermined taper angle R is formed therebetween; and furthermore two side surfaces 25 formed to continuously extend from the two tapered surfaces 21 through their corresponding second boundaries 23 toward the dorsal side (dorsal end 15 side).

The metallic base is preferably the blade base 11 in the embodiment described above because an edged tool having a sharper edge according to the invention is obtained.

Although the manufacturing method of the blade base 11 according to the preferred embodiment as described above is not particularly limited, the blade base 11 is preferably manufactured by a method to be described next with reference to FIG. 3A to FIG. 3F.

Figure 3A:
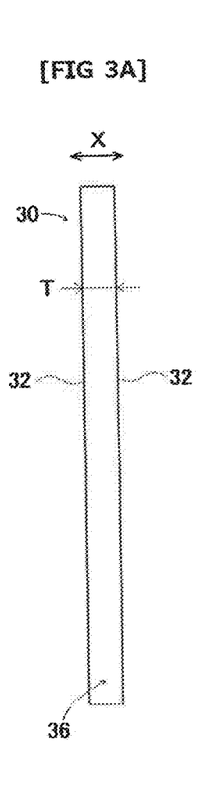
FIGS. 3A to 3F are views for illustrating a method of manufacturing the metallic base that may be used in the invention.

First of all, as illustrated in FIG. 3A, in a plate-like blade member 30 with a thickness T which is formed to have a predetermined shape, both side surfaces 32 in its thickness direction X which are substantially parallel to each other are ground. Then, as a result of grinding, as illustrated in FIG. 3B, both the side surfaces 32 of the blade member 30 are inclined to gradually reduce the thickness of the blade member 30 from a dorsal end 34 side to a ventral end 36.

Figure 3B:
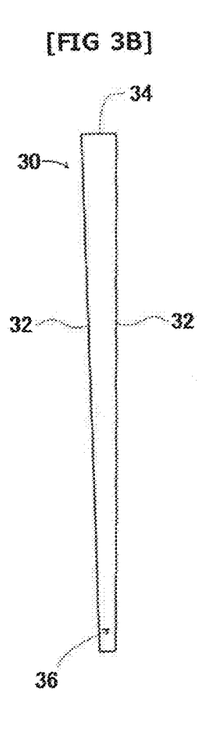
Figure 3C:
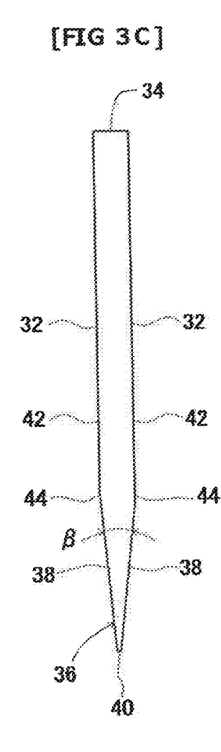

Next, a part of each of both the side surfaces 32 of the blade member 30 illustrated in FIG. 3B which is positioned at the ventral end 36 is ground. As a result of grinding, as illustrated in FIG. 3C, two tapered ground surfaces 38 which extend continuously from the ventral end 36 toward the dorsal side at the predetermined taper angle β in an oblique shape are formed, each having a predetermined region from a taper end 40. In both the side surfaces 32 of the blade member 30, ground side surfaces 42 which are regions between the tapered ground surfaces 38 and the dorsal end 34, respectively, are kept in a state of FIG. 3B.

Figure 3D:
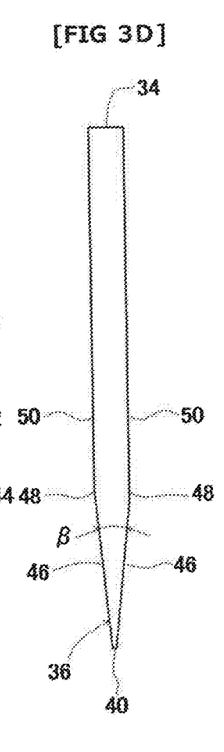

Next, boundaries between the tapered ground surfaces 38 and the ground side surfaces 42 are defined as boundaries 44, and the tapered ground surfaces 38, the boundaries 44, and the ground side surfaces 42 continuing from the respective boundaries 44 are polished. As a result of polishing, as illustrated in FIG. 3D, two tapered polished surfaces 46 which extend continuously from the taper end 40 toward the dorsal side at the predetermined taper angle R in an oblique shape can be formed while also forming polished side surfaces 50 continuing from the respective tapered polished surfaces 46 toward the dorsal side through their corresponding boundaries 48.

Figure 3E:
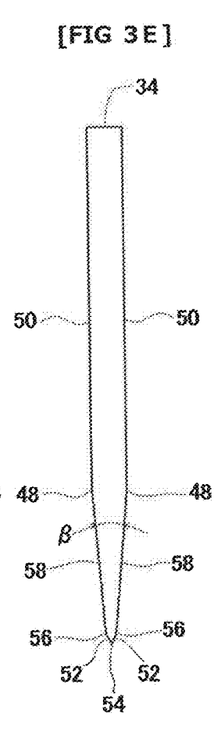
Figure 3F:
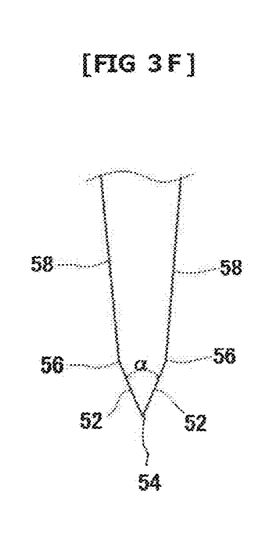

Next, at the taper end 40, the tapered polished surfaces 46 are sharpened. Then, as illustrated in FIG. 3E and FIG. 3F, two processed surfaces 52 which extend toward the dorsal side at the predetermined sharpening angle α in an oblique shape are formed, each having a predetermined region from a blade edge 54. Tapered surfaces 58 which extend continuously from the two processed surfaces 52 toward the dorsal side through their corresponding boundaries 56 at the predetermined taper angle R in an oblique shape are further formed.

<Plasma Step>

Next, the plasma step included in the manufacturing method of the invention is described.

The plasma step in the manufacturing method of the invention is a step which involves placing the metallic base in the vacuum chamber, generating plasma in the vacuum chamber, and subjecting the metallic base to plasma treatment at the temperature of the metallic base adjusted to 280 to 325° C. to sharpen the processed surfaces to thereby obtain the edged tool precursor.

Figure 4:
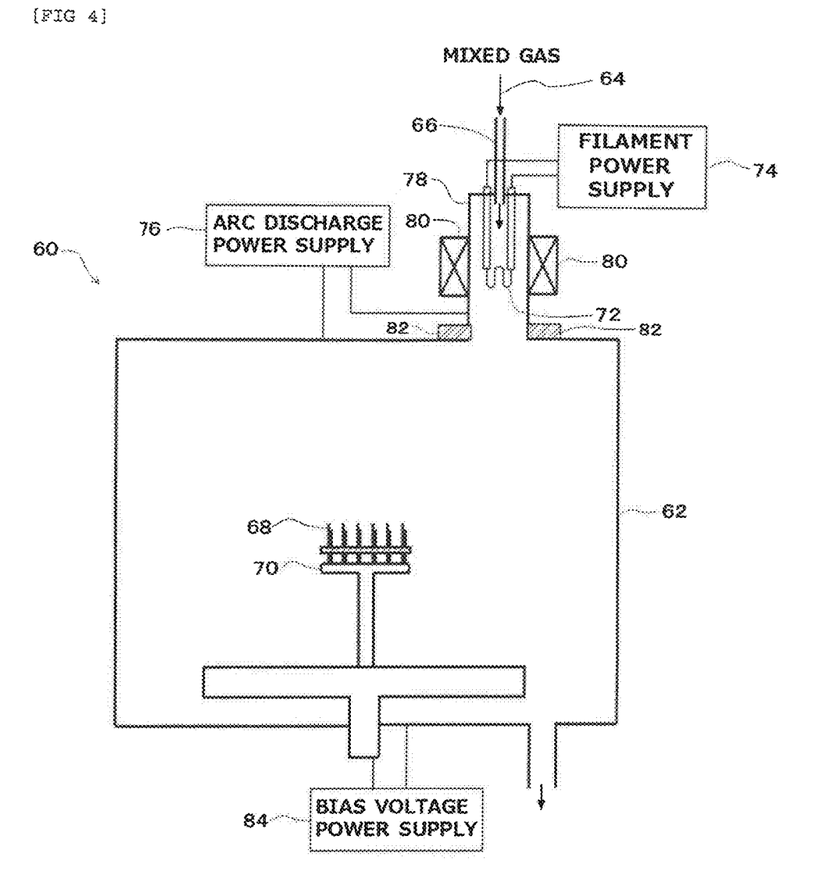
FIG. 4 is a schematic cross-sectional view of a plasma apparatus with which the manufacturing method of the invention can be preferably performed.

The metallic base is preferably subjected to plasma treatment using an apparatus illustrated in FIG. 4.

FIG. 4 illustrates a plasma apparatus based on an arc discharge hot filament process. In FIG. 4, the plasma apparatus 60 includes a vacuum chamber 62, a gas introduction device 66 configured to introduce discharge gas 64 into the vacuum chamber 62, a holder 70 configured to hold a metallic base 68 placed in the vacuum chamber 62, a filament 72 positioned to oppose the metallic base 68, and a filament power supply 74 configured to supply the filament 72 with current. The plasma apparatus 60 further includes a hollow cathode electrode 78 having an arc discharge power supply 76 positioned to cover the filament 72, a coil 80 and an insulator 82 positioned on an outer surface of the hollow cathode electrode 78, and a bias voltage power supply 84 capable of applying bias voltage to the metallic base 68.

In the plasma apparatus 60 as described above, the discharge gas 64 is introduced into the vacuum chamber 62 with the use of the gas introduction device 66 to fill the vacuum chamber 62 with the discharge gas 64, and thereafter the filament 72 is supplied with current to generate glow discharge, whereby plasma of the discharge gas can be generated. Generation of the plasma increases the temperature of the metallic base. Accordingly, the temperature of the metallic base can be adjusted in a range of 280 to 325° C. (preferably 290 to 310° C.) by adjusting the amount of plasma generation by means of filament current and arc discharge current while adjusting the amount of ions entering the metallic base by means of bias voltage. As a result of plasma treatment of the metallic base which is performed while keeping this state, the processed surfaces thereof are etched to be sharpened.

The bias voltage is preferably 50 to 1,000 V.

The plasma treatment time is preferably 1 to 10 hours, and more preferably 1.5 to 4 hours.

The ion current density is preferably 0.1 to 50 mA/cm$^2$, and more preferably 0.5 to 10 mA/cm$^2$.

When generating plasma, the discharge gas preferably has a pressure of 0.1 to 11 Pa, and more preferably 0.3 to 2.5 Pa.

The discharge gas is preferably a rare gas or nitrogen, and more preferably contains a main gas and a reactive gas as its main ingredients. When the discharge gas contains a main gas and a reactive gas as its main ingredients, an edge portion of each processed surface of the metallic base has a preferred shape, sharpness is considerably improved, and furthermore durability is also excellent.

The main ingredient as used herein means that the ingredient is contained at a volume ratio of not less than 70%. Specifically, the total concentration of the main gas and the reactive gas in the discharge gas is preferably not less than 70 volt. The total concentration is more preferably not less than 80 vol %, even more preferably not less than 95 vol %, and still more preferably not less than 99 vol %.

The main gas means a rare gas or nitrogen, and is preferably nitrogen.

The reactive gas means a gas other than the main gas, and is preferably oxygen.

It is preferred to use nitrogen as the main gas and oxygen as the reactive gas because each processed surface has a more preferred shape, sharpness is further considerably improved, and in addition durability is improved. Therefore, it is more preferred to use a discharge gas containing nitrogen and air.

A discharge gas containing nitrogen is preferred because the processed surfaces of the metallic base are nitrided to improve the strength and the durability.

The partial pressure of the main gas (MGP) in the discharge gas is preferably 0.01 to 10 Pa, and more preferably 0.1 to 5 Pa.

The partial pressure of the reactive gas (AGP) in the discharge gas is preferably not less than 0.001 Pa, and more preferably 0.001 to 0.08 Pa.

The ratio between the partial pressure of the reactive gas (AGP) and the partial pressure of the main gas (MGP) in the discharge gas (AGP/MGP) is preferably 0.001 to 0.1, and more preferably 0.002 to 0.05 because processed surfaces each having a more preferred shape are obtained, and further sharpness is considerably improved, and in addition durability is improved.

The partial pressure of the main gas (MGP) and the partial pressure of the reactive gas (AGP) in the manufacturing method of the invention can be calculated from the capacity of the vacuum chamber 62 and the amount of gas discharged from the vacuum chamber 62 as well as measurement values obtained by measuring the flow rates of the main gas and the reactive gas at the time of introducing the discharge gas 64 into the vacuum chamber 62 through the gas introduction device 66 with the use of a flowmeter (for example, an orifice type).

When introducing nitrogen and air into the vacuum chamber 62, for instance, the partial pressure of the main gas (MGP) and the partial pressure of the reactive gas (AGP) can be calculated from the capacity of the vacuum chamber 62 and the amount of gas discharged from the vacuum chamber 62 in the same way as above, except that the flow rates of gases corresponding to the main gas and the reactive gas contained in the nitrogen and air, respectively, are calculated from the respective gas concentrations after the flow rates of the nitrogen and air are measured using a flowmeter as above.

The pressure of the discharge gas can be determined as the sum of the partial pressures of the main gas and the reactive gas calculated by the measurement as described above.

An edged tool precursor can be obtained by the plasma step as described above.

<Oxidation Step>

Next, the oxidation step included in the manufacturing method of the invention is described.

The oxidation step in the manufacturing method of the invention is a step which involves reducing the internal temperature of the vacuum chamber to a specific temperature ranging from 100 to 225° C. after completion of generation of plasma and introducing an oxygen-containing gas into the vacuum chamber to form an oxide film on surfaces of the edged tool precursor.

An edged tool hardly having spot rusting and coloration on it surfaces can be obtained by the oxidation step as described above.

Although the reason why such an excellent edged tool is obtained is not clear at present, the inventors of the invention presume as follows:

Occurrence of rusting is related to moisture in air, and it is presumed that spot rusting occurs under a corrosion cell action when moisture in air adheres to a surface of an edged tool precursor for a long period of time. When the vacuum chamber is exposed to atmospheric air immediately after plasma treatment at a base temperature ranging from 280 to 325° C., even if moisture in air adheres to a surface of an edged tool precursor, the moisture evaporates instantaneously because of the high temperature, no local cell action occurs, and an oxide film (a passive film when the metallic base is made of stainless steel) is uniformly formed on the surface. Accordingly, spot rusting is prevented from occurring after that. However, when the vacuum chamber is exposed to atmospheric air after plasma treatment without reducing the internal temperature of the vacuum chamber to the specific temperature, there remains a problem in that a surface of the metallic base to be described later is discolored (colored) to reduce the commercial value.

Then, the interior of the vacuum chamber is cooled (is allowed to cool, for instance) to the specific temperature ranging from 100 to 225° C., preferably 150 to 215° C., and more preferably 190 to 210° C., and after that, an oxygen-containing gas is introduced into the vacuum chamber. Examples of the oxygen-containing gas include a gas mixture of an inert gas and oxygen, a gas mixture of nitrogen and oxygen, a gas mixture of argon and oxygen, and atmospheric air. When atmospheric air is used as the oxygen-containing gas, the oxygen-containing gas can be introduced into the vacuum chamber through exposure to atmospheric air. Exposure to atmospheric air can be achieved by opening a valve connecting the vacuum chamber with the outside of the vacuum chamber which is at ordinary temperature and pressure and introducing the atmospheric air into the vacuum chamber. When introducing an oxygen-containing gas other than the atmospheric air into the vacuum chamber, for instance, a method which involves connecting a high pressure gas cylinder filled with an air- or oxygen-containing gas mixture with the vacuum chamber through a pressure regulator and a valve, and opening the valve to expose the vacuum chamber to atmospheric pressure, and a method which involves connecting atmospheric air after application of pressure with a compressor, moisture removal, and oil removal with the vacuum chamber through a pressure regulator and a valve, and opening the valve are possible.

An edged tool of the invention is obtained by the manufacturing method of the invention as described above. The edged tool of the invention is, for example, an edged tool as illustrated in FIG. 5A.

Figure 5A:
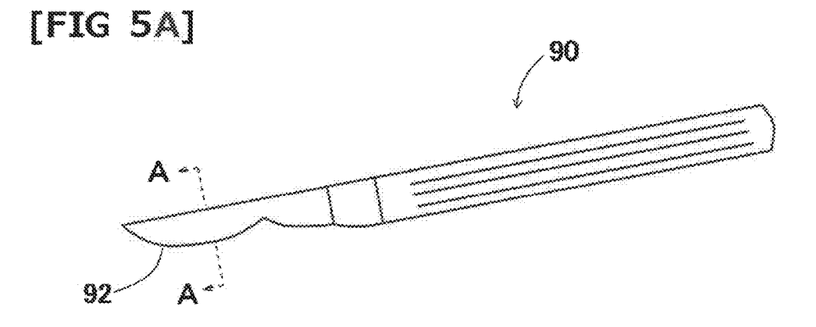
FIGS. 5A and 5B are schematic views for illustrating an edged tool of the invention.
Figure 5B:
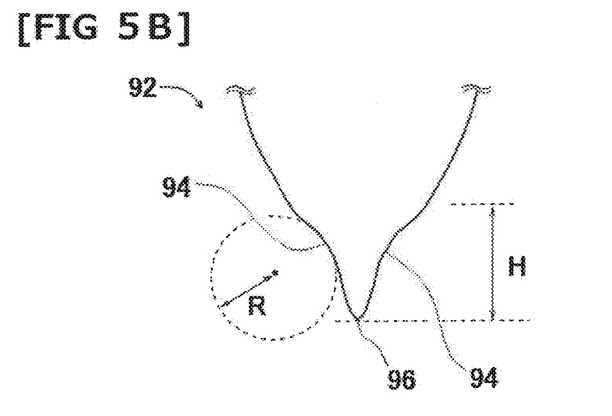

FIG. 5A is a schematic side view of a surgical knife which illustrates a preferred embodiment of the edged tool of the invention, and FIG. 5B is a cross-sectional view (schematic view) taken along line A-A in FIG. 5A.

A blade edge portion 92 of a knife 90 illustrated in FIG. 5A has, in cross section, two concave surfaces 94 recessed inward so as to have curved surfaces each having a predetermined radius of curvature, as illustrated in FIG. 5B. Each of the concave surfaces 94 are formed to have a distance H from a blade edge 96 toward the dorsal side.

Each of the concave surfaces preferably has a radius of curvature (R in FIG. 5B) of 30 to 2,500 nm and more preferably 100 to 1,000 nm.

The distance H is preferably 5 to 300 nm and more preferably 10 to 100 nm.

The knife 90 as described above is excellent in sharpness because the blade edge 96 is highly sharpened by plasma treatment.

EXAMPLES

Example 1

A stainless steel plate (GIN 5, Hitachi Metals, Ltd.) was used as an experimental sample. Its composition is shown in Table 1. In principle, the ingredient other than C, Si, Mn, P, S, and Cr is Fe.

TABLE 1

| | Chemical ingredient (%) | | | | | |
|---|---|---|---|---|---|---|
| | C | Si | Mn | P | S | Cr |
| GIN 5 | 0.60-6.70 | 0.35 or less | 0.60-0.80 | 0.030 or less | 0.020 or less | 12.50-13.50 |

<Determination of Surface Coloration Temperature>

When a stainless steel plate is subjected to heat treatment in an air atmosphere, an oxide film is formed on a surface thereof. The surface of the stainless steel plate is colored red or blue depending on the thickness of the oxide film. Since coloration of the material surface reduces the commercial value, a temperature range in which no coloration occurs was investigated.

Figure 6:
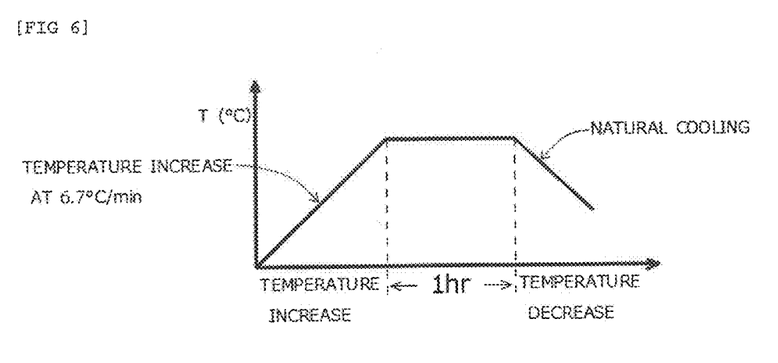
FIG. 6 is a graph showing heat treatment conditions.

Heat treatment was performed under conditions shown in FIG. 6. Specifically, the temperature was increased from room temperature to a predetermined temperature at a rate of 6.7° C./min at an atmospheric pressure and held at the predetermined temperature for 1 hour, which was followed by natural cooling. Experiments were made at the predetermined temperature set to each of temperatures of 100, 200, 225, 250, 300, 400, and 500° C.

Figure 7:
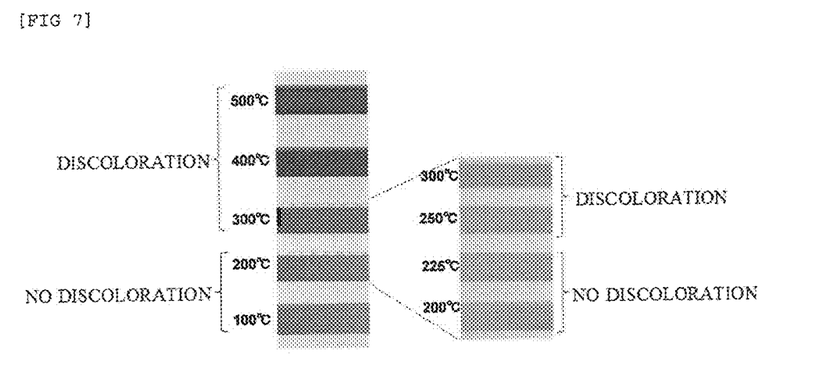
FIG. 7 is an exterior photo of a sample after a heat treatment experiment.

FIG. 7 illustrates an exterior photo of a sample after a heat treatment experiment.

First of all, heat treatment was performed up to 500° C. in increments of 100° C., and it was found that there is a boundary for causing no discoloration between 200° C. and 300° C. Then, the sample was investigated at temperatures between 200° C. and 300° C., and it was found that discoloration does not occur at 225° C. or less.

<Plasma Treatment>

Plasma treatment processing for an edged tool is performed in a vacuum atmosphere at a predetermined temperature ranging from 280 to 325° C. The temperature at the time of exposing the vacuum chamber to atmospheric pressure after plasma treatment was changed below. The sample exposed to atmospheric air was stored overnight at an atmospheric pressure and the degree of rusting on its surface was checked.

Pattern 1: The interior of the vacuum chamber was allowed to cool to room temperature after completion of plasma treatment, which was followed by exposure to atmospheric air. The thus obtained sample is hereinafter referred to also as "Sample 1."

Pattern 2: The interior of the vacuum chamber was allowed to cool to 200° C. after completion of plasma treatment, which was followed by exposure to atmospheric air. The thus obtained sample is hereinafter referred to also as "Sample 2."

Figure 8:
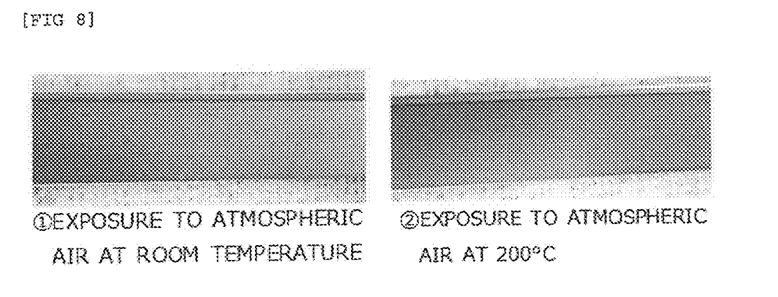
FIG. 8 illustrates exterior photos of Samples 1 and 2.

As a result, as illustrated in FIG. 8, spot rusting occurred in Sample 1, whereas no rusting occurred in Sample 2.

<Measurement Results>

Each of the two types of samples (Sample 1, Sample 2) having undergone treatment described in <Plasma Treatment> above was subjected to qualitative analysis using EPMA (JXA-8500FS manufactured by JEOL Ltd.). The results are shown in FIGS. 9 and 10.

A part of Sample 1 where no rusting occurred was subjected to qualitative analysis using EPMA.

Figure 9:
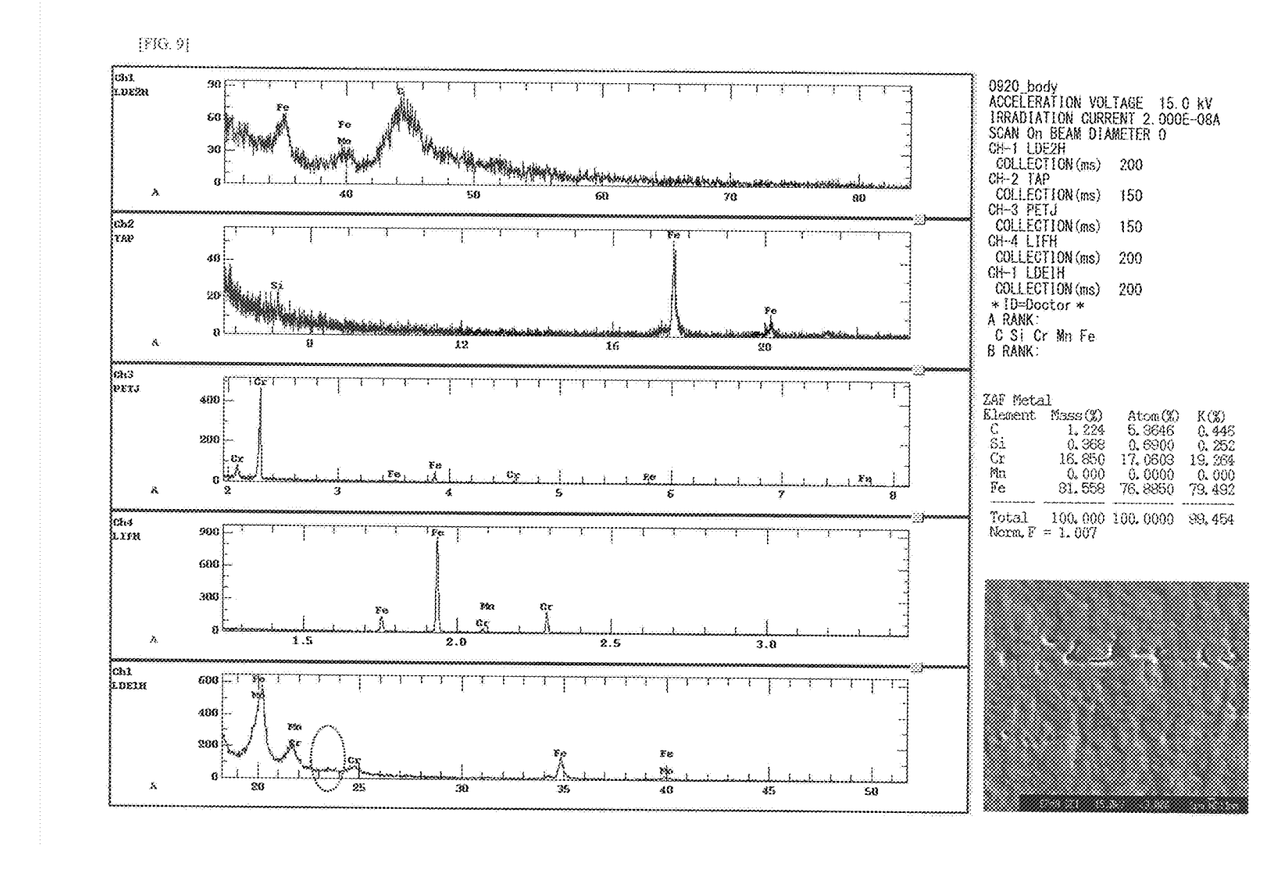
FIG. 9 is a view showing EPMA qualitative analysis results of Sample 1.
Figure 10:
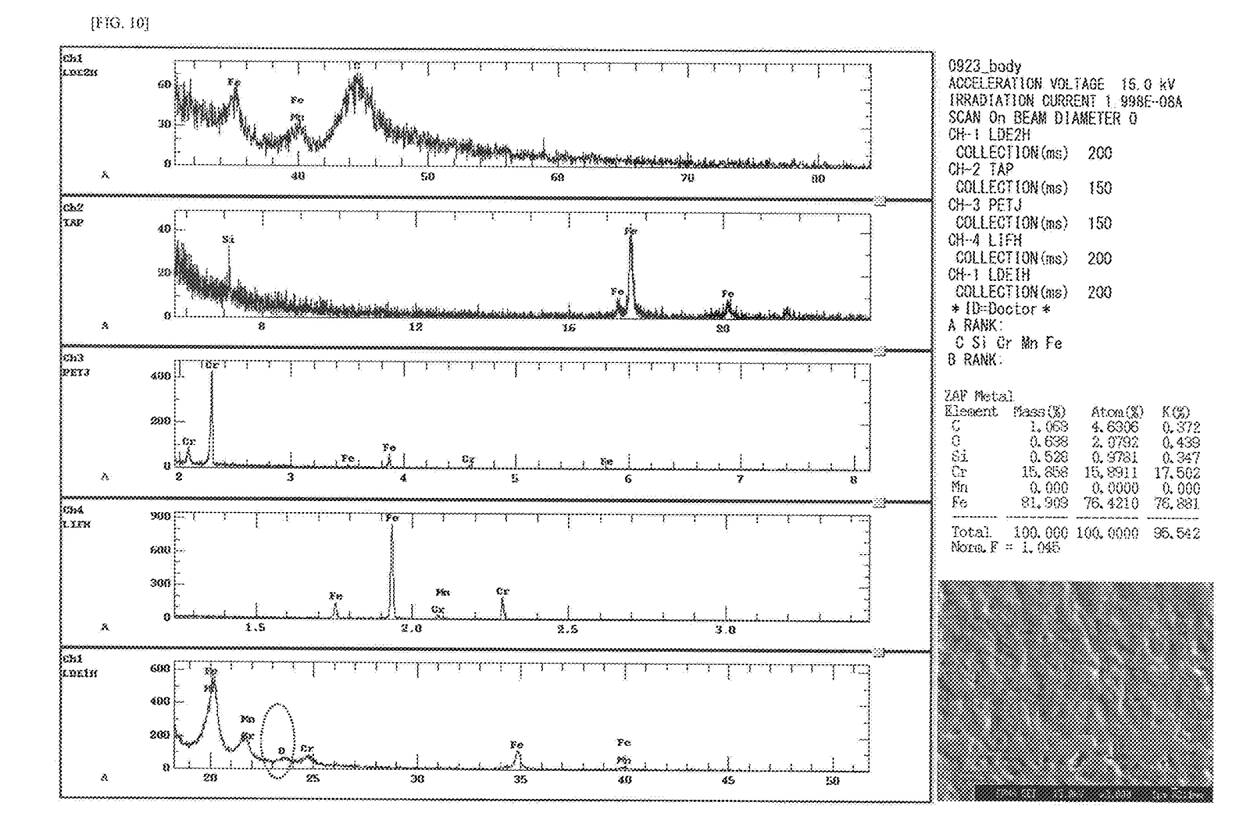
FIG. 10 is a view showing EPMA qualitative analysis results of Sample 2.

FIG. 9 and FIG. 10 show that oxygen which was not detected in Sample 1 is detected in Sample 2, as is seen from Table 2, and that an oxide film (passive film) is formed on its surface.

TABLE 2

| Element | Sample 1 | Sample 2 |
|---|---|---|
| C | 1.224 | 1.068 |
| O | 0.000 | 0.638 |
| Si | 0.368 | 0.528 |
| Cr | 16.850 | 15.858 |
| Fe | 81.558 | 81.909 |
| Total | 100 | 100 |

What is claimed is:

1. An edged tool-manufacturing method comprising:
   a plasma step which includes placing a metallic base having processed surfaces obtained by processing in a vacuum chamber, generating plasma in the vacuum chamber, and subjecting the metallic base to plasma treatment at a temperature of the metallic base adjusted to 280 to 325° C. to sharpen the processed surfaces to thereby obtain an edged tool precursor; and
   an oxidation step which includes reducing an internal temperature of the vacuum chamber, by natural cooling, to a specific temperature ranging from 190 to 210° C. after completion of generation of the plasma, and then introducing an oxygen-containing gas into the vacuum chamber to form an oxide film on surfaces of the edged tool precursor.

2. The edged tool-manufacturing method according to claim 1, wherein the metallic base is made of stainless steel, and the oxide film is a passive film.

* * * * *